J. J. KENNEL.
SILO FEEDER.
APPLICATION FILED MAY 11, 1908.

963,583.

Patented July 5, 1910.

Witnesses:
Elmer R. Shipley.
M S Belden.

John J. Kennel
Inventor
by James W. See
Attorney

UNITED STATES PATENT OFFICE.

JOHN J. KENNEL, OF TRENTON, OHIO.

SILO-FEEDER.

963,583.

Specification of Letters Patent.

Patented July 5, 1910.

Application filed May 11, 1908. Serial No. 432,033.

*To all whom it may concern:*

Be it known that I, JOHN J. KENNEL, a citizen of the United States, residing at Trenton, Butler county, Ohio, have invented certain new and useful Improvements in Silo-Feeders, of which the following is a specification.

This invention, relating to improved mechanism for properly distributing ensilage in silos, will be readily understood from the following description taken in connection with the accompanying drawing, in which:—

Figure 1:
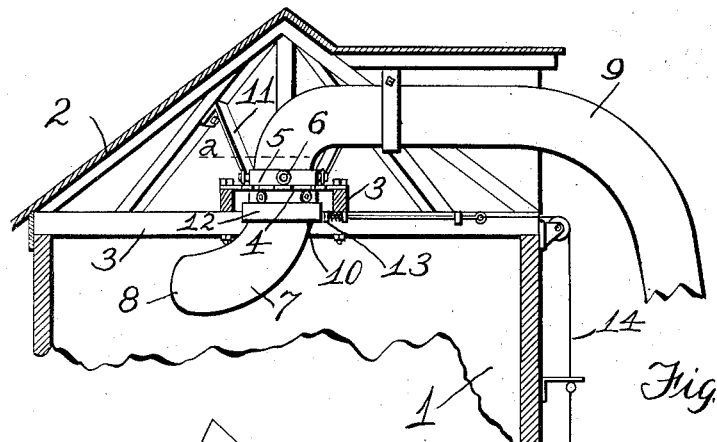
Figure 2:
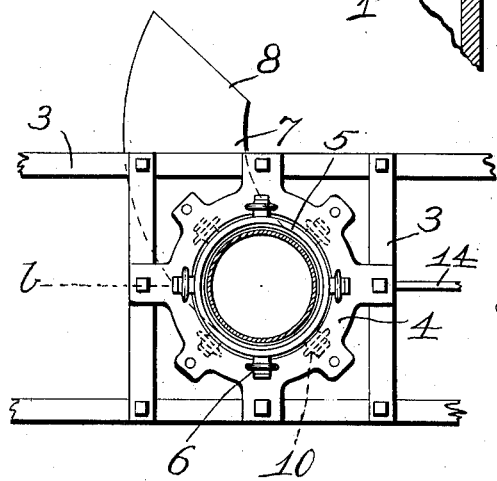
Figure 3:
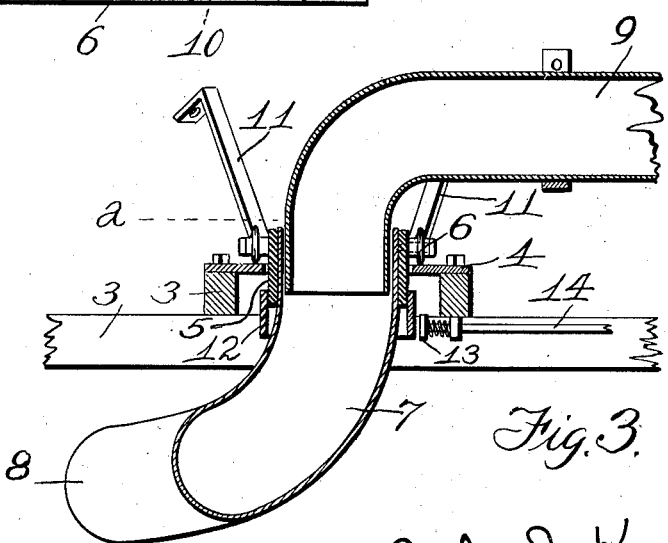

Figure 1 is a side elevation of my improved silo feeder the upper portion of the silo appearing in vertical section in the plane of line *b* of Fig. 2: Fig. 2 a horizontal section of the feeder in the plane of line *a* of Figs. 1 and 3: and Fig. 3 a vertical section of the feeder in the plane of line *b* of Fig. 2.

In the drawing:—1, indicates the upper portion of the silo: 2, its roof: 3, supporting timbers at the top of the silo: 4, a horizontal plate secured to these timbers and having a large circular opening at substantially the center of the silo, the plate forming a trackway around the opening: 5, a collar disposed within and mounted for free rotation within the opening of the plate: 6, a series of anti-friction wheels carried by the exterior of the collar, above the plate, and having their lower peripheries engaging downwardly upon the plate as a track: 7, a pipe elbow having its upper end secured to the collar, the outer end of the elbow being curved away from a plane radial to the center of the collar in such manner that the outward discharge from the elbow will be tangential to a circle struck from the center of the collar: 8, the discharge end of the elbow: 9, a supply pipe supported at the top of the silo and having its inner end discharging into the upper end of the elbow, this supply pipe being merely typical of means for bringing the ensilage to the elbow: 10, a series of anti-friction wheels carried by the collar below and free from the plate but adapted to make contact with the under surface of the plate in case of any material tipping of the elbow and collar: and 11, diagonal braces having their lower ends secured to the plate and their upper ends secured to the roof of the silo: 12, a brake collar fast with the elbow: 13, a spring-pressed brake adapted to make contact with the brake collar and prevent the rotation of the elbow: and 14, a connection from the brake to a point outside the silo where it may conveniently be reached by hand in applying or releasing the brake.

In case the ensilage is brought to the silo by means of an air blast through the supply pipe 9, as will generally be the case, the ensilage becomes spouted out of the open end of the elbow and, by reason of the tangential direction of the discharge, the elbow sweeps around in a circular path and distributes the ensilage uniformly around in the outer portions of the silo, and, as the filling proceeds, ensilage flows inwardly when the angle of repose is reached. By this means there is a uniform and proper distribution of the ensilage in the silo without the necessity of having a man inside the silo. In some cases the air blast may be on the feeder while ensilage is not being supplied and, in such case, it is not desirable that the elbow be in idle rotation. Again, it is desirable under some circumstances to especially direct the flow of ensilage to some particular spot in the circumference of the silo or, in other words, to temporarily arrest the circular distribution of the ensilage. In such case the brake may be applied to the elbow, whereupon the elbow ceases its rotary motion. The brake collar 12 is merely a convenient construction for getting a surface for the application of the brake, and it will of course be understood that any device for arresting the rotary motion of the elbow will answer the purpose of the particular construction illustrated.

I claim:—

A silo feeder comprising, a track fixedly secured at the top of the silo and having an opening at substantially the center of the silo, a collar mounted for free rotation in said opening, anti-friction wheels carried by the collar and running on the track around the opening therein, an elbow having its upper end secured to said collar and having its outer portion curved so as to effect a tangential discharge, a brake device adapted to arrest the rotation of the elbow, means exterior to the silo and connected with the brake to serve in controlling it, and means for delivering ensilage into the upper end of said elbow, substantially as set forth.

JOHN J. KENNEL.

Witnesses:
PAUL W. HOOVEN,
M. S. BELDEN.